July 19, 1927.

W. M. MOXLEY 1,636,064

AUTOMATIC CONTROLLING MECHANISM FOR AUTOMOBILES, TRUCKS,
TRAILERS, AND THE LIKE

Filed July 30, 1926    2 Sheets-Sheet 2

Inventor
William M. Moxley,
By Shepherd & Campbell
Attorneys

Patented July 19, 1927.

1,636,064

UNITED STATES PATENT OFFICE.

WILLIAM M. MOXLEY, OF MARCELINE, MISSOURI.

AUTOMATIC CONTROLLING MECHANISM FOR AUTOMOBILES, TRUCKS, TRAILERS, AND THE LIKE.

Application filed July 30, 1926. Serial No. 125,982.

This invention relates to an automatic controlling mechanism for automobiles, trucks, trailers and the like and it has for its object to provide a simple and inexpensive mechanism so constructed and arranged that when the vehicle reaches a predetermined degree of speed, the fuel supply to the same will be cut off and if the speed of the vehicle increases beyond the point at which the fuel is cut off, such further increase in speed will result in an application of the brakes.

Further objects and advantages of the invention will be set forth in the detailed description which follows.

In the accompanying drawing

Like numerals designate corresponding parts in all of the figures of the drawing.

Figure 1:
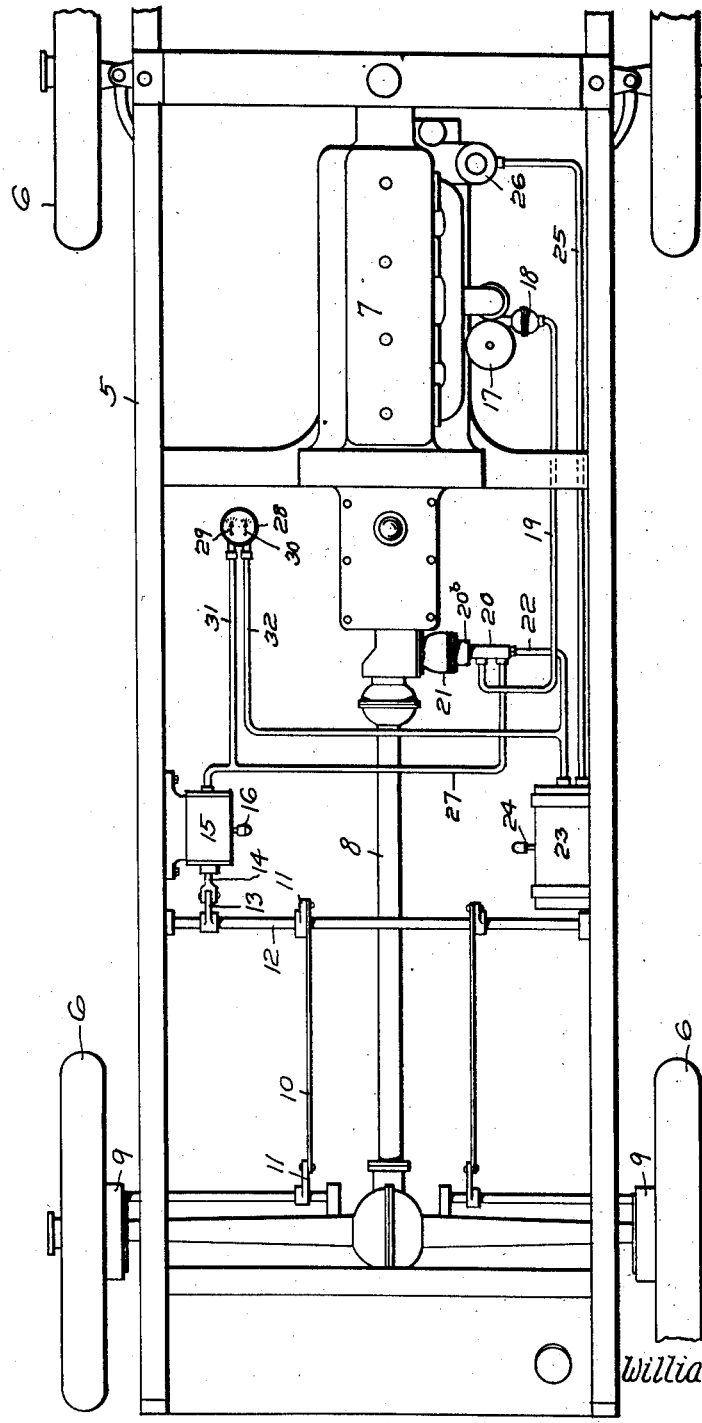
Fig. 1 is a diagrammatic plan view of a part of a motor driven vehicle having the invention applied thereto.

Referring to the drawing, 5 designates the chassis and 6 the supporting wheels of a motor vehicle. The engine of the vehicle is indicated at 7 and its usual longitudinally extending drive shaft is indicated at 8. The usual rear wheel brakes 9 of the vehicle may be actuated by connecting rods 10 and cranks 11, from a rock shaft 12, said rock shaft in turn being actuated by a crank 13, and piston rod 14, of a brake cylinder 15. The brake cylinder is provided with a relief or safety valve 16. A carburetor of conventional type is associated with the motor 7 and is designated 17. A pressure controlled fuel valve 18, more particularly described later on, is associated with the carburetor and is connected by a pipe 19 with the casing 20 of a governor controlled valve 21. This governor controlled valve is preferably associated with and driven from the longitudinal drive shaft 8. Casing 20 of the governor controlled valve is connected by a pipe 22 with an air reservoir 23, the latter being provided with a safety valve 24. This air reservoir receives its supply of air through a conduit 25, which leads from an engine driven air compressor or pump 26.

I wish it to be understood that the invention is not limited to any particular type of air compressor. It is quite common to associate air compressors with the motors of motor vehicles. This is usually done for tire inflation purposes and it has resulted in placing upon the market available types of conventional air compressors adapted to be driven directly by the motors of motor vehicles. I contemplate using any suitable motor for my purposes. Some of these motors are constructed to be automatically cut out of action after they have compressed the air to a predetermined degree.

A pipe 27 leads from the brake cylinder to the casing 20 of the governor controlled valve 21. A duplex gauge 28, having the two hands 29 and 30, is connected by the pipes 31 and 32 to the brake cylinder line 27 and with the air reservoir line 22, respectively.

The operation of the device is as follows:

When the motor 7 is started the air compressor 26 compresses the air to a predetermined degree in the air reservoir 23, it being manifest that the pressure supplied to the reservoir 23 cannot exceed that for which the safety valve 24 is set, even aside from the fact that the compressor 26 may be of the automatic type referred to.

Figure 2:
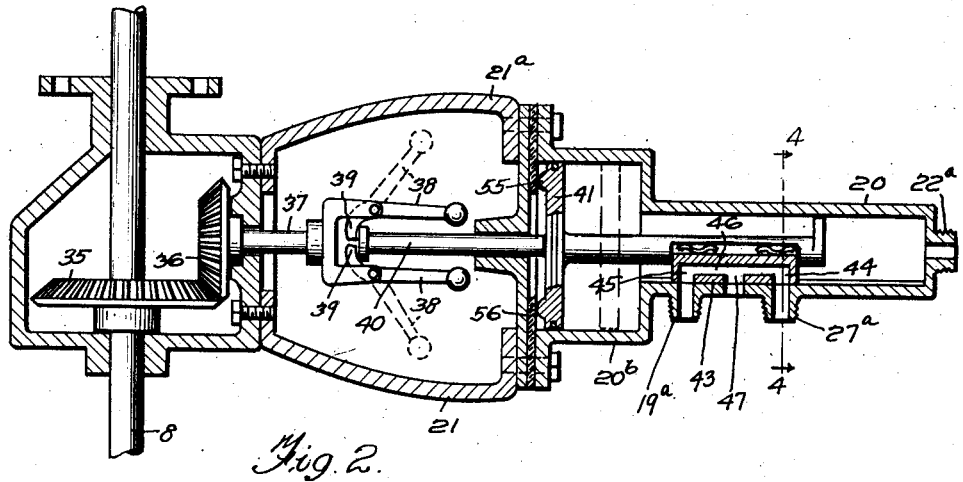
Fig. 2 is a detailed sectional view of the governor actuated control valve.
Figure 4:
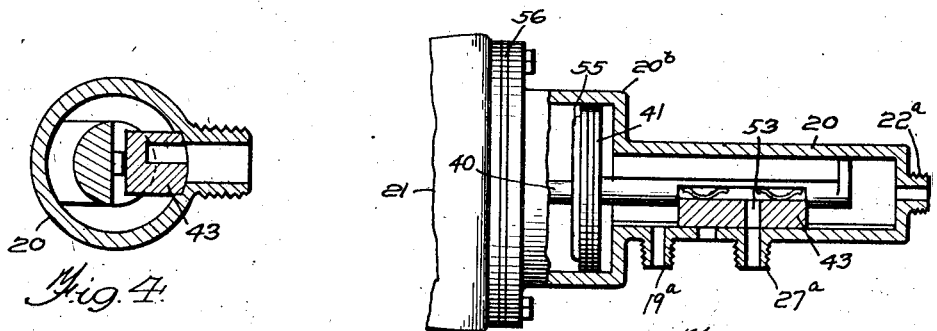
Fig. 4 is a transverse sectional view upon line 4—4 of Fig. 2.
Figure 3:
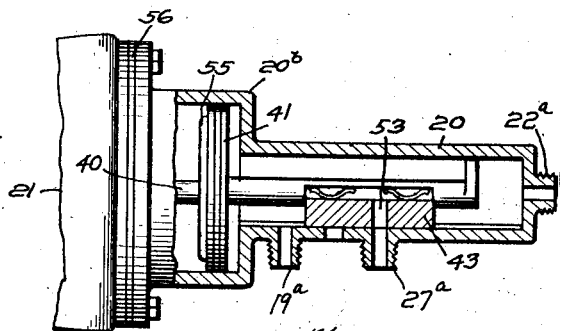
Fig. 3 is a fragmentary sectional view of a part of the control valve showing the same in the position it occupies after the brakes have been applied.
Figure 5:
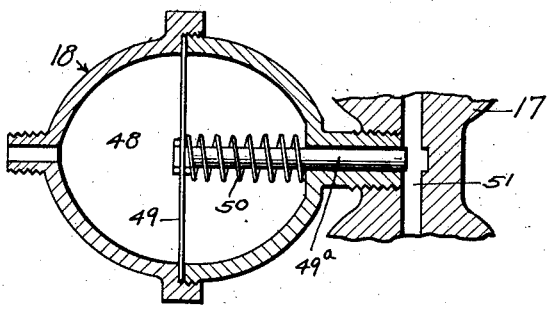
Fig. 5 is a sectional view through the pressure actuated fuel cut-off valve, hereinafter described.
Figure 6:
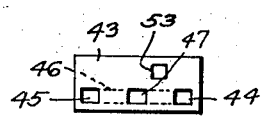
Fig. 6 is a detail view of the slide valve hereinafter described.
Figure 7:
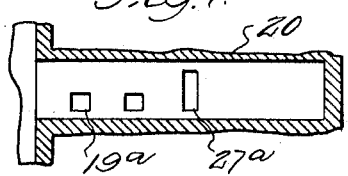
Fig. 7 is a plan view of the valve seat.

Air pressure from the reservoir 23 passes through the line 22 to the casing 20 of the governor controlled valve 21. By referring to Fig. 2, it will be seen that the main drive shaft 8 carries a bevel gear 35 which meshes with a pinion 36 on a governor shaft 37. Upon a predetermined increase of speed of the vehicle the governor arms 38 fly outwardly under the action of centrifugal force and the noses 39 of said arms thrust a plunger 40, endwise, and against a piston 41. When the force exerted by the governor exceeds the force exerted by the pressure of air upon the top of the piston 41, (it being remembered that the casing 20 is receiving the pressure from the reservoir 23) said piston will move outwardly carrying with it a slide valve 43. The nipple 22ᵃ in Fig. 3 receives the pipe 22 from the reservoir, the nipple 19ª receives the pipe 19 leading to the pressure actuated fuel shut-off valve 18, and the nipple 27ª receives the pipe 17 which leads to the brake cylinder. Valve 43 has ports 44 and 45 formed therein which are connected by a longitudinally extending port 46. Port 46 is in communication with an exhaust port 47 of the slide valve and with the parts in the position illustrated in Fig. 2, the nipples 19ª and 27ª are both in communication through the exhaust port 27 and channel 46 with an exhaust port formed in the wall of the casing 20 and the slide valve lies in such position as to prevent the passage of any air into the pipes 19 and 27. If, however, the speed increases to such an extent as to cause the governor to thrust the piston outwardly or to the right in Fig. 2, the initial movement of the piston and its stem will move the valve to uncover the entrance to nipple 19ª permitting the passage of air from casing 20 through the pipe 19 to the cavity 48 of the valve 18, (see Fig. 5) where it acts upon the diaphragm 49 to move a needle valve 49ª against the tension of a spring 50 to close the passage 51, which is a part of the passage between the float chamber and the needle valve of the carburetor of the engine. This immediately cuts off the supply of fuel to the motor and, normally will bring about such a reduction in speed of the vehicle as to insure the object at which the invention is aimed, namely, to prevent the vehicle from being run above a given rate of speed.

However it may be that if the vehicle is on a down grade its speed will continue to increase even though the fuel be shut off and in that case continued outward movement of the piston 41 (Fig. 3) under the action of the governor, will result in moving the slide valve 43 to such a position that another port 53 formed therein to one side of the ports 44 and 45 is brought into alignment with the nipple 27ª so that air may pass directly from the casing 20 through the pipe 27 to the brake cylinder 15, where it will act to apply the brakes and speedily reduce the speed of the vehicle to normal.

To prevent the leakage of air from casing 20 past piston 41 I provide said piston with an annular protuberance 55 which is adapted to make air tight contact with a rubber gasket 56 that is held in place between the body 21ª of valve 21 and a cap 20ᵇ in which the piston 41 moves.

It is to be understood that the construction shown in the accompanying drawings is merely illustrative. Many refinements of construction will readily suggest themselves in the practical use of the device. Therefore it is to be understood that the invention is not limited to the precise construction shown and described but that it includes within its purview whatever changes fairly come within either the terms or the spirit of the appended claims.

Having described my invention what I claim is:

1. The combination with a motor vehicle, its internal combustion engine and its brake mechanism of a brake cylinder associated with the brake mechanism, a pressure operated shut-off valve for the carburetor of the engine, a controlling valve comprising a casing, a valve in said casing, conduits leading from said casing to the brake cylinder and to the pressure operated carburetor shut-off valve, a fluid reservoir, a compressing means driven by the motor, connected with the reservoir, a conduit leading from the reservoir to the valve casing, a governor, means for driving said governor from the mechanism of the motor vehicle and a connection between the governor and valve whereby the valve moves under the influence of the governor.

2. A structure as recited in claim 1 in combination with a piston carried by said connection, said piston being under pressure of the fluid from the fluid reservoir, so that movement of the piston, connection and valve takes place only when the action of the governor overcomes the fluid pressure.

3. The combination with a motor vehicle, its internal combustion engine and its brake mechanism, of a brake cylinder associated with the brake mechanism, a pressure operated shut-off valve for the carburetor of the engine, a mechanical governor operated from the engine, a compressor driven by the engine for creating fluid pressure, a valve controlling the fluid pressure supplied to the brake cylinder and the carburetor controlling valve, a connection between the governor and the last named valve, including an element which is moved against the fluid pressure by the action of the governor, so that the valve is moved only when the action of the governor overcomes the fluid pressure.

In testimony whereof I affix my signature.

WILLIAM M. MOXLEY.